UNITED STATES PATENT OFFICE.

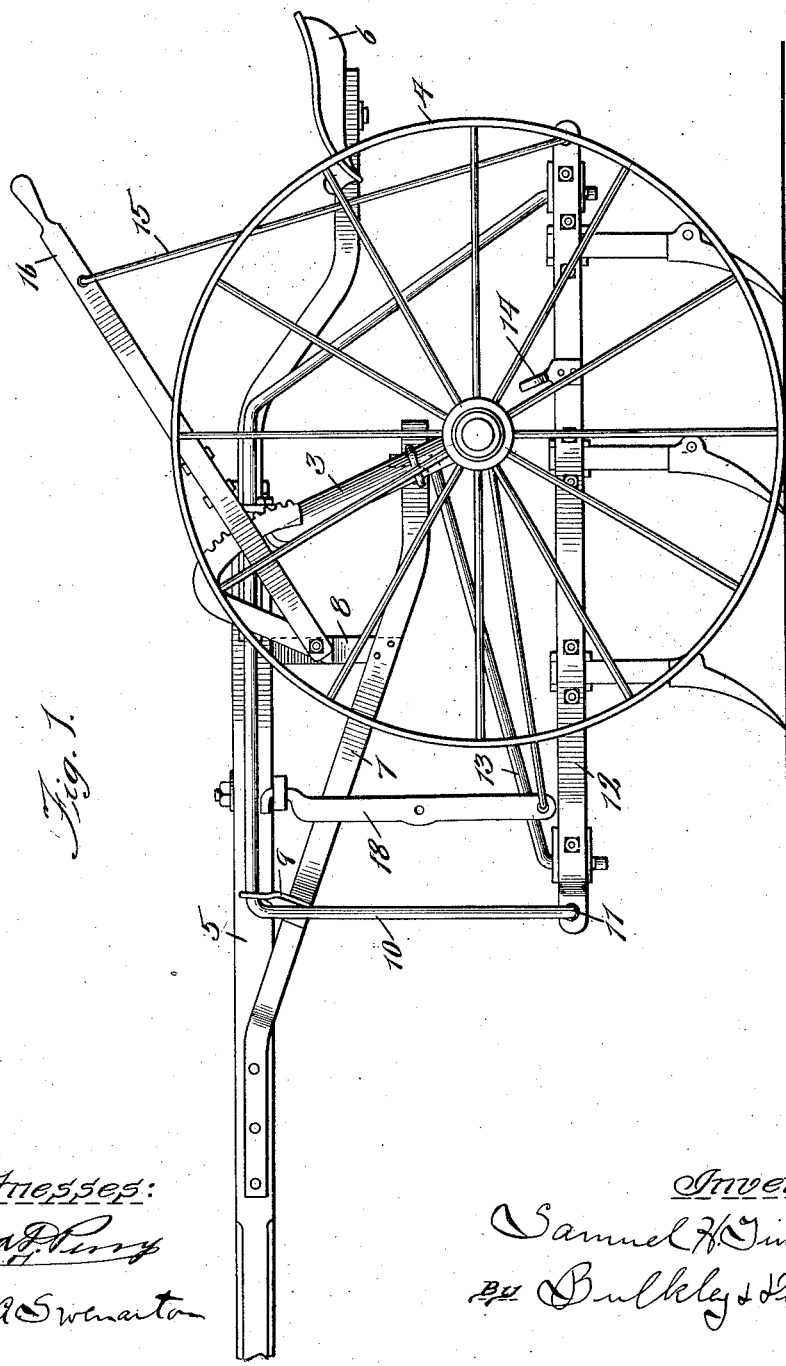

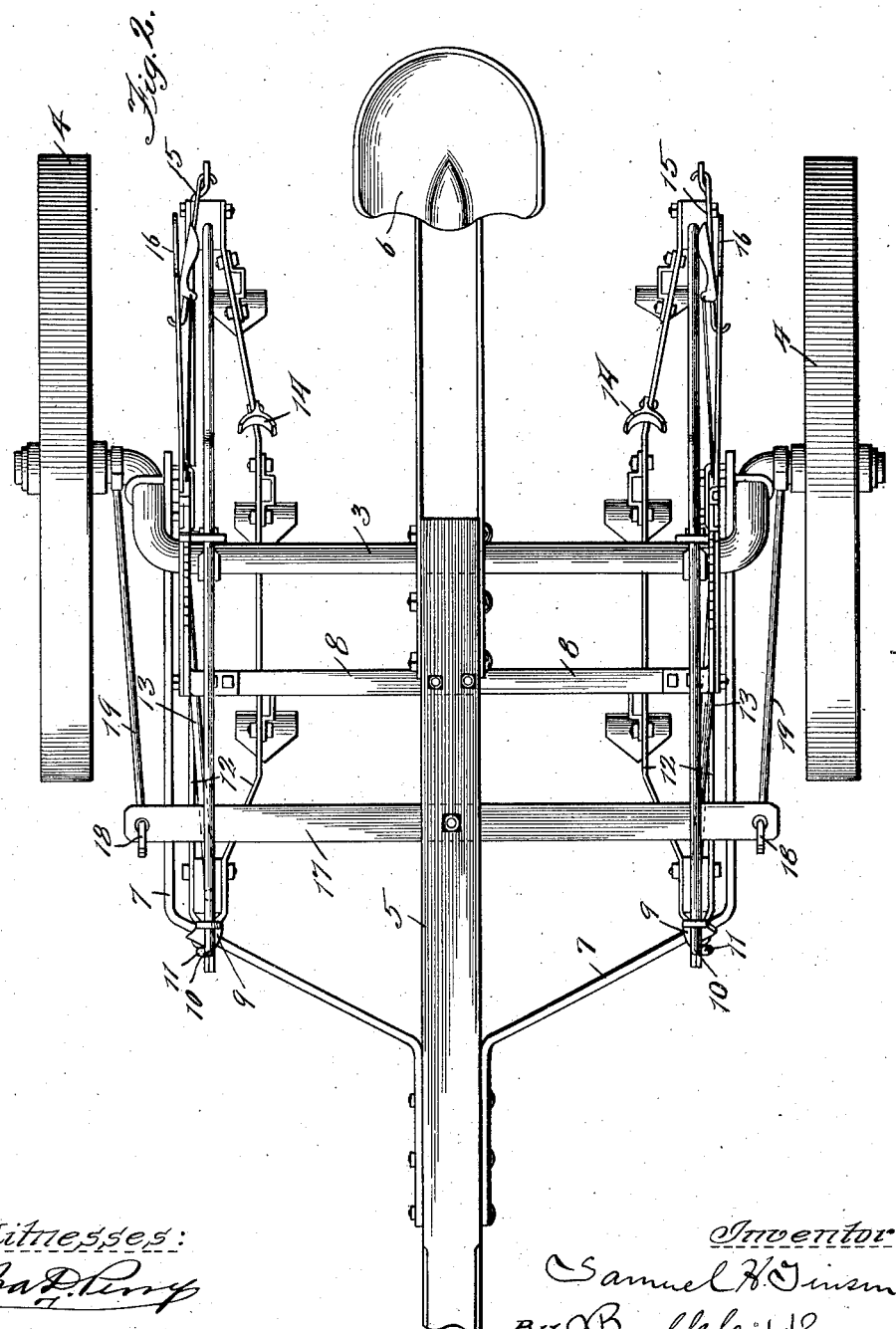

SAMUEL H. TINSMAN, OF MORRIS, ILLINOIS.

CULTIVATOR.

1,025,220.  Specification of Letters Patent.  Patented May 7, 1912.

Application filed June 26, 1911. Serial No. 635,287.

*To all whom it may concern:*

Be it known that I, SAMUEL H. TINSMAN, a citizen of the United States of America, and resident of Morris, Grundy county, Illinois, have invented a certain new and useful Improvement in Cultivators, of which the following is a specification.

My invention relates to wheel cultivators, and more particularly to improved means for transmitting power from the tongue to the shovel gangs.

Heretofore it has been customary to connect the tongue to the shovel gangs in such a manner that a pull upon the tongue produces a corresponding pull upon the shovel gangs. This pull being exerted from a point above the gangs has a tendency to pull the gangs out of the ground. By my improved construction, however, I provide connections between the tongue and shovel gangs whereby a pull upon the tongue produces a forward and slightly downward push upon the forward end of the shovel gangs, whereby these gangs are pushed through the ground, and have no tendency to rise out of the ground as in the prior constructions. I likewise provide means whereby in my improved construction the gangs are maintained in a position parallel to the line of travel of the cultivator when the gangs are swung from side to side. Furthermore, in my construction the gangs are so mounted that they can be swung from side to side for the purpose of dodging small plants.

These and other objects will be more clearly understood by reference to the accompanying drawings, in which—

Figure 1 represents a side elevation of my improved cultivator. Fig. 2 is a plan view of the same.

Similar reference characters refer to similar parts in the figures of the drawings.

I have shown a cultivator comprising a bail-shaped axle 3, upon the ends of which are mounted the wheels 4. Upon the upper bail portion of this axle the tongue 5 is mounted in the usual manner, and upon the rear end of this tongue is mounted the driver's seat 6. A pair of downwardly extending brace bars 7 are connected at their forward ends to the opposite side of the tongue. These brace bars extend laterally and then rearwardly, as clearly shown in Fig. 2. These brace bars are supported at an intermediate point by means of an arch-shaped member 8, which is connected to the under side of the tongue, near the rear end thereof, as shown in Fig. 2.

As both sides of my cultivator are similar, I will give a description of one side thereof, and it will be understood that this description applies equally well to the opposite side.

Mounted upon the bracket 9 is a yoke-shaped member 10, which member is supported at its rear end by means of a bracket attached to the upper portion of the bail axle 3. The downwardly extending forward end 11 of this yoke-shaped member is connected in any suitable manner to the forward end of the shovel gang 12, while the rearward end of this yoke member extends on an incline downwardly and rearwardly, and is provided at its lower end with a perpendicular portion, which is in loose engagement with the rear end of the shovel gang. In the construction shown, I obtain this engagement by merely having the end pass through an opening within the shovel gang.

Connected to the rear part of each of the brace bars 7, and extending forwardly and downwardly therefrom, are a pair of push bars 13 which at their forward ends are connected to the forward end of the corresponding shovel gang 12. Suitable stirrups 14 are provided upon the shovel gangs for swinging these gangs from side to side, and I likewise provide connections 15 and hand-levers 16 for raising and lowering the gangs in a well known manner.

In the operation of my cultivator, a pull upon the tongue 5 transmits through the brace bar 7 and the push-bar 13 a forward and slightly downward push to the shovel gangs 12. Thus the shovel gangs are pushed through the soil instead of being pulled, as in the usual construction. It will be noted that on account of the slightly lateral thrust which the push bar 13 exerts upon the shovel gangs the tendency would be for these shovel gangs to swing sidewise when a pull is exerted upon the tongue. This sidewise movement, however, is counteracted by means of the yoke bar 10, as in combination with the sidewise thrust there is also a downward thrust which tends to swing the gangs to their lowest position, and this position would be that in which the yoke-bar is in substantially a vertical position. It will thus be seen that this second tendency of the gangs to seek their lowest positions would tend to swing them inward and thus counteract the first-mentioned tendency of the gangs to swing outward. In this manner the gangs are maintained practically in a state of equilibrium, and will almost stay in any position to which they are moved, and can be moved very easily from side to side in dodging the plants.

I have shown a suitable frame comprising an upper cross-member 17 from the opposite ends of which extend the downwardly extending links 18 which are connected to a sleeve on the axle by means of the rods 19. It will be understood that the double-trees can be connected to these downwardly extending members 18 in any suitable and well known manner.

It will thus be seen that I have devised a very simple and efficient form of cultivator, and while I have shown one specific form thereof, I do not wish to be limited to the exact construction described.

What I claim as my invention is:

1. In a cultivator, the combination with an axle, wheels on said axle, a tongue connected with said axle, shovel gangs, connections from said tongue to said shovel gangs whereby a forward pull on said tongue transmits a forward push to said shovel gangs, said connections being the only connections between said tongue and the forward ends of said gangs, and a yoke member swingingly mounted on said tongue and connected at its lower ends to the front and rear of said shovel gangs, to maintain said gangs in alinement when they are swung sidewise and to prevent said forward push swinging said gangs sidewise.

2. In a cultivator, the combination with an axle, wheels on said axle, a tongue connected with said axle, shovel gangs, and connections for transmitting power to said shovel gangs, said connections being connected at one end to said tongue and having a portion extending forward and downward to said shovel gangs, a yoke member swingingly mounted on said tongue and connected at its lower ends to the front and rear of said shovel gangs, whereby a forward pull on said tongue transmits a forward push to said shovel gangs, said yoke member preventing said forward push swinging said gangs sidewise.

3. In a cultivator, the combination with an axle, wheels on said axle, a tongue connected with said axle, shovel gangs, a brace bar connected to said tongue and extending downwardly and rearwardly to a point in the rear of the forward ends of said shovel gangs, a connection extending forwardly and downwardly from the rear end of said brace bar to the forward end of said shovel gangs, and a yoke member swingingly mounted on said tongue and connected at its lower ends to the front and rear of said shovel gangs, whereby a forward pull on said tongue transmits a forward push to said shovel gangs said yoke member preventing said forward push swinging said gangs sidewise.

4. In a cultivator, the combination with an axle, wheels on said axle, a tongue connected with said axle, shovel gangs, and a rod pivotally connected at its rear end to a part of said cultivator and extending forwardly and downwardly and pivotally connected at its forward end to said gangs so as to be free to swing laterally at its forward end, whereby a forward pull on said tongue transmits a forward push to said shovel gangs.

5. In a cultivator, the combination with an axle, wheels on said axle, a tongue connected with said axle, shovel gangs, a brace bar connected to said tongue and extending downwardly and rearwardly to a point in the rear of the forward ends of said shovel gangs, and a rod pivotally connected at its rear end to the rear end of said brace bar, and extending forwardly and downwardly and pivotally connected at its forward end to said gangs so as to swing laterally with said gangs, whereby a forward pull on said tongue transmits a forward push to said shovel gangs.

Signed by me at Chicago, Illinois, this 29th day of May, 1911.

SAMUEL H. TINSMAN.

Witnesses:
H. A. SWENARTON,
E. H. CLEGG.

---

Copies of this patent may be obtained for five cents each, by addressing the "Commissioner of Patents, Washington, D. C."